Aug. 7, 1951        A. ROSE ET AL        2,562,951
ARMOR
Filed Aug. 26, 1946
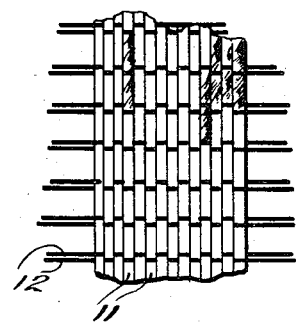
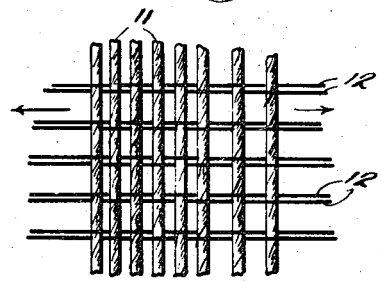
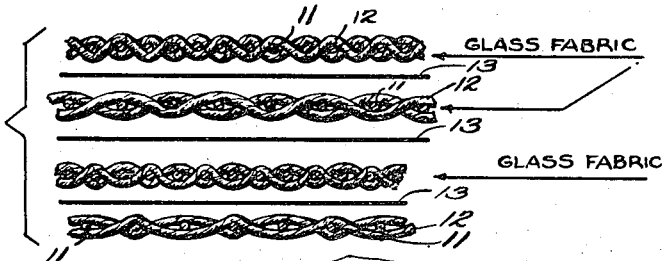
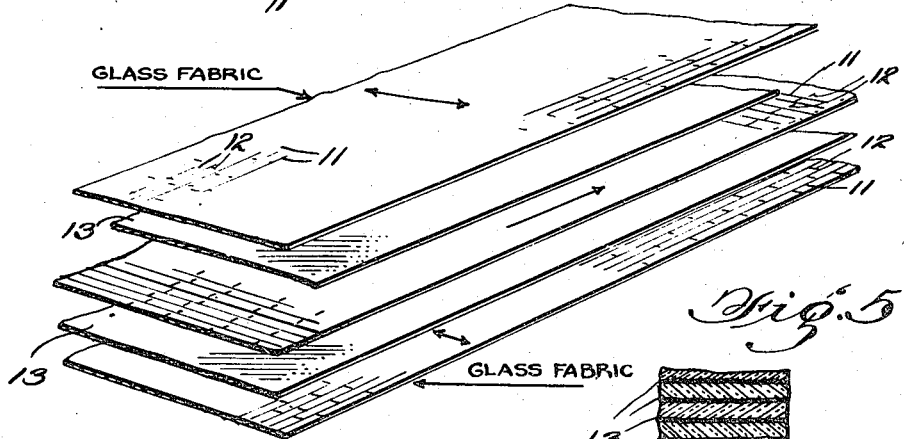
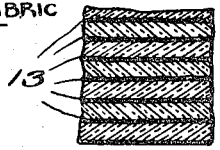
INVENTORS
Arthur Rose
and George J. Merritt
BY
W. J. Egleston,
ATTORNEY Patented Aug. 7, 1951

2,562,951

UNITED STATES PATENT OFFICE 2,562,951

ARMOR

Arthur Rose, State College, Pa., and George J. Merritt, Washington, D. C.

Application August 26, 1946, Serial No. 692,941

7 Claims. (Cl. 154—52.5)

(Granted under the act of March 3, 1883, as amended April 30, 1928; 370 O. G. 757)

The invention described herein, if patented, may be manufactured and used by or for the Government for governmental purposes without the payment to us of any royalty thereon.

This invention relates to armor, and more particularly to a body of laminated glass fabric suitable for the protection of an individual against injury or death from shell fragments and other projectiles.

Body armor for individual combatants has been extensively used in the middle ages, but became useless with the advent of firearms because the weight of metal armor adequate to protect the wearer against a firearm is too great to permit free movement. Attempts have been made to overcome this defect by designing special shapes of steel armor plate, or by forming non-metallic bodies into shields or body armor plates; however, such attempts have not been successful.

Among non-metallic body armor of the prior art have been various laminated bodies of fibrous material; this type of body armor has failed to gain acceptance because of its inability to afford protection against a high-speed projectile of the bullet or fragmentation type.

We have found that a body comprising resin-bonded laminated glass fabric affords secure protection against shell fragments, particularly anti-aircraft ("flak"), and against bullets, particularly lead bullets as customarily used in pistols and revolvers. After extensive experimentation and testing, certain constructions and compositions have been developed by us, which were found to answer best the purpose for which they are intended and which will be more fully described in this specification.

It is thus a principal object of the present invention to provide an armor comprising a plurality of layers of resin-bonded glass fabric.

Another object of our invention is an armor plate combining low weight per unit of surface with high resistance against penetration by projectiles.

A further object of this invention is a process for the manufacture of a laminated armor plate comprising resin-bonded glass fabric, which permits inexpensive mass production of the same.

Still another object of our invention is a glass fabric having desirable stretch characteristics which make it suitable for the building-up of an armor plate.

These and other objects of our invention will become more fully apparent as the description of the invention proceeds.

It will be understood that while our invention is principally described in its aspects as a body armor, it is not limited to this specific application; an armor plate in accordance with our invention may, for instance, be used to clad the floor and/or side walls of an airplane fuselage, and thus securely protect it against anti-aircraft artillery.

The accompanying drawings illustrate a preferred example of a laminated glass fabric, built up to form an armor plate in accordance with our invention.

Fig. 1 of the drawings shows one layer of glass fabric in the untensioned state;

Fig. 2 shows the layer of Fig. 1 in tensioned or stretched state;

Fig. 3 is a sectional exploded view of laminae of glass fabric, arranged for assembly to an armor plate in accordance with our invention;

Fig. 4 diagrammatically illustrates, in a perspective view, the components of a laminated armor plate of our invention;

Fig. 5 illustrates, in fragmentary section, a laminated resin-bonded body after the bonding operation.

More particularly, the individual layers or laminae of our composite armor plate consist of glass cloth comprising a warp of parallel continuous glass threads 11, which are held together by filler threads 12; the filler threads 12 are spaced from each other for a substantial distance to permit stretching of the cloth in a direction perpendicular to the direction of the glass yarn constituting the warp. Such stretching, if caused by sidewise pull or by an impact in a plane perpendicular to the plane of the cloth, causes threads 11 to ride up on filler threads 12; on the other hand, a pull in the direction of the threads 11 will cause no stretching because of the lack of elasticity of the material of glass threads 11. Such a cloth or fabric will be referred to as "unidirectional fabric" as this description proceeds. Filler threads 12 are preferably of glass filaments and of much lesser body than the warp yarn; other materials, such as cotton, silk, rayon, or similar textiles, may, however, be substituted therefor.

An example of a glass cloth, made of "Fiberglas" (a material made by Owens-Corning Fiberglas Corporation), adapted for use as a lamina or layer for our laminated armor plate is:

| | |
|---|---|
| Weave | Crowfoot satin |
| Weight, oz. per sq. yd. | 8.7 |
| Width within selvages, in. | 38 and 40 |
| Warp yarn | 450-4/3[1] |
| Fill yarn | 450-1/0[2] |
| Warp yarns per in. | 50 |
| Fill yarns per in. | 30 |
| Warp strength of cloth, lb. per in. of width | 700 |
| Fill strength of cloth, lb. per in. of length | 25 |
| Filament dia., in. | 0.00020-0.00025 |
| Filament tensile strength, approx. p. s. i. | 300,000 |

[1] This signifies three-ply yarn, each ply containing four strands and each strand "weighing" 450 hundreds of yd. per lb. Each strand contains 204 filaments, or a total of 2,448 filaments in each warp yarn.
[2] This is a single strand consisting of 204 filaments and "weighing" 450 hundreds of yd. per lb.

Each individual layer of glass cloth is then coated with a binder capable of joining it to the adjacent layer. It has been found that contact resins, i. e., resins capable of curing at low pressure and without application of high temperatures, are eminently useful for the lamination of the composite body. Examples of such resins are copolymers of styrene and of the ester of a polyhydric alcohol and a polybasic acid (polyester), such as phthalic acid or phthalic acid anhydride, also known as alkyd resins. Specific examples of such resins are:

Laminac 4122, made by American Cyanamid Company,
Thalids X-526 and X-526S, ethylene glycol maleate polyester resins containing approximately 25% styrene, made by Monsanto Chemical Co.
Bakelite XRS-75, made by Bakelite Corporation,
Selectron 5003, a styrene and propylene glycol maleate phthalate copolymer resin made by Pittsburgh Plate Glass Company.

These resins are thermosetting and are applied to the glass-cloth laminae with the addition of a polymerization catalyst such a lauryl peroxide or benzyl peroxide. The above-named polymerization catalysts are mentioned merely by way of example, as any agent which causes the polymerization of the resin will answer the purpose; in fact, the catalysts may be entirely omitted, and a moderate increase of heat and/or pressure applied instead to cause the desired polymerization and curing. It has been found in practice that curing temperatures between 200-285° F. and pressures of 175-300 pounds per square inch produce highly satisfactory laminated bodies; these figures are by way of example and may be varied by increasing the pressure and decreasing the heat, or vice versa, or be modified in accordance with the presence or absence of a particular polymerization catalyst.

Inasmuch as individual layers of glass cloth in accordance with our invention are flexible, it is possible to wind them on a reel and to unwind and cut the desired lengths from said reel prior to lamination. In order to build an armor plate capable of stopping a shell fragment or bullet, we have placed each layer or lamina in a direction wherein the warp of the first layer is at a right angle to the warp of the succeeding layer, in which position they are bonded together; such a process will hereafter be referred to as "cross-lamination" and is illustrated in Figs. 3 and 4 of the drawings, wherein 13 denotes the presence of a resin layer. The arrows placed on Fig. 4 denote the direction of stretchability of the individual layers.

A laminated body may also be built by arranging the individual layers of glass fabric unidirectionally, that is, by placing the warps of all layers in parallel position rather than "cross-laminating"; such a body has great tensile strength, but less resistance to penetration by a shell fragment or bullet as compared with a cross-laminated body of equal thickness.

The number of plies needed to build up an armor plate varies with the principal use for which the same is intended; thus, a comparatively large number of plies will be needed to stop a high-velocity bullet. We have found that a good general-purpose armor plate, suitable for individual body armor, is produced by cross-laminating 15-18 plies of unidirectional glass fabric together, however, a 12-ply armor plate also affords substantial protection. Considerations affecting the choice of a particular number of plies are similar to those affecting the designing of battleship armor; greater thickness results in better protection but increased weight and decreased mobility. Our preferred armor plate weighs about 1.3 pounds per square foot of surface, and is a stiff thermoset panel of about ⅛ to about 1/16 inch thickness, containing about 23% to 25% resin, and the remainder glass. The percentage of resin binder is subject to variation in accordance with individual manufacturing requirements. We have found that a resin content below 15% will not afford a bond of the desired strength, while a resin content above 30% results in undesired brittleness.

The laminated body built up in accordance with the foregoing method possesses high tensile strength, about 45,000 to 50,000 pounds per square inch if cross-laminated, and up to 100,000 pounds per square inch if unidirectionally laminated, that is, if the warps of all laminae extend in identical directions. It will be remembered, however, that though the tensile strength of the last-mentioned unidirectionally laminated body is greater than that of a cross-laminated body, the cross-laminated body offers greater resistance to penetration by projectiles. The specific gravity of the laminated body is about 1.75, its modulus of elasticity in tension about 2.5 to $10^6$ per square inch, its flexural strength about 7,500 pounds per square inch, and its shearing strength still lower. It is highly resistant to chemical change and to the influence of weather, and is free from odor and taste.

No definite reason can be given at this time why a laminated body in accordance with our invention is capable of stopping a shell fragment or bullet. It is a fact, however, that it does. A 45-caliber bullet fired from a pistol at point-blank range against our armor plate embeds itself therein without penetrating the same. Similar results are obtained by exposing our armor plate to the fragmentation of an anti-aircraft shell. An armor plate of ordinary thickness will, of course, be incapable of standing up against fragmentation of a heavy artillery shell; by increasing its thickness it could be made to do so at a sacrifice of low weight per unit of surface.

A bullet or shell fragment embedded in our armor plate causes its laminations to separate or "peel" locally. This prenomenon, together with the unidirectional stretch characteristics of the cross-laminated body, is believed to account for the effectiveness of the armor plate; the momentum of the bullet is dissipated in the breaking of the resin bonds between the plies, and is further absorbed by the yielding of the unidirectionally woven warps of the laminae, which latter action might be roughly compared to the retarding action of parallel cables on the deck of an aircraft carrier, offered to the grapple hook of a seaplane landing on that deck. Another analogy may be drawn from the phenomenon of a bullet hitting sand; by shifting the position of a great number of relatively removable particles of sand, it quickly loses its momentum and buries itself in the sand after a comparatively brief penetration. These examples should not be taken as scientific explanation of the penetration-resistant characteristics of our armor plate, but merely as rough analogies to known instances of loss of forward speed of a body traveling at high speed.

Resistance to penetration by bullets or shell fragments was also observed in a laminated body consisting of conventional cross-weave glass fabric made into a laminated body by resin bonding of a plurality of layers. However, the penetration resistance of such a plate is greatly inferior to that of an equal thickness and weight of an armor plate made of resin-bonded layers of cross-laminated unidirectional fabric, as illustrated in Figs. 1 to 4 of the drawings.

In use, our armor plate may be worn on the body in the form of plates supported in appropriate pockets of a combat jacket or similar garment; the pockets should be so arranged as to avoid gaps between plates and protect vital organs of the wearer. The armor plate is die-cut or saw-cut into shapes corresponding to the shapes of the pockets. By appropriate conventional low-pressure molding (e. g., at 220° F. for 10–30 minutes), the laminated body can be formed in desired shapes, such as the shape of a helmet, an airplane fuselage floor or wall, an airplane gunner's blister or turret, or other desired objects, which may include such peace-time uses as ships' hulls, refrigerator cabinets, automobile parts, etc.

The foregoing illustration of various aspects of our invention should not be considered as being in the nature of a limitation of the scope thereof, but rather as examples of the manner in which it may be practiced. The scope of our invention is defined in the appended claims.

We claim:

1. A lightweight self-sustaining laminated armor plate capable of local delamination under the impact of a projectile, comprising a plurality of cross-laminated layers of closely packed continuous glass yarn warp and spaced continuous glass yarn filling fabric, the number and thickness of said glass warp yarns greatly exceeding the number and thickness of said glass filling yarns, and said glass warp yarns being freely slidable on said glass filling yarns prior to the bonding of said layers, whereby each of said layers is rendered stretchable only in a direction normal to its warp but strongly resistant to stretch in a direction parallel to its warp, said layers being bonded together by from between 15% to 30%, by weight of said armor plate, of thermosetting synthetic resin material.

2. A lightweight self-sustaining laminated armor plate capable of local delamination under the impact of a projectile, comprising a plurality of cross-laminated layers of closely packed continuous glass yarn warp and spaced continuous glass yarn filling fabric, the number and thickness of said glass warp yarns greatly exceeding the number and thickness of said glass filling yarns, and said glass warp yarns being freely slidable on said glass filling yarns prior to the bonding of said layers, whereby each of said layers is rendered stretchable only in a direction normal to its warp but strongly resistant to stretch in a direction parallel to its warp, said layers being bonded together by from between 15% to 30%, by weight of said armor plate, of styrene and polyhydric alcohol polybasic acid ester copolymer resin.

3. A lightweight self-sustaining laminated armor plate capable of local delamination under the impact of a projectile, comprising a plurality of cross-laminated layers of closely packed continuous glass yarn warp and spaced continuous glass yarn filling fabric, the number and thickness of said glass warp yarns greatly exceeding the number and thickness of said glass filling yarns, and said glass warp yarns being freely slidable on said glass filling yarns prior to the bonding of said layers, whereby each of said layers is rendered stretchable only in a direction normal to its warp but strongly resistant to stretch in a direction parallel to its warp, said layers being bonded together by from between 15% to 30%, by weight of said armor plate, of styrene and polyhydric alcohol phthalate copolymer resin.

4. An armor plate according to claim 1, wherein the weight of the warp threads per linear inch of said layers is about 20 times the weight of the filling threads.

5. A lightweight self-sustaining laminated armor plate capable of local delamination under the impact of a projectile, said armor plate having a thickness of about 1/8 to about 3/16 inch, and comprising about 12 to about 18 cross-laminated layers of closely packed continuous glass yarn warp and spaced continuous glass yarn filling fabric, the number and thickness of said glass warp yarns greatly exceeding the number and thickness of said glass filling yarns, and said glass warp yarns being freely slidable on said glass filling yarns prior to the bonding of said layers, whereby each of said layers is rendered stretchable only in a direction normal to its warp but strongly resistant to stretch in a direction parallel to its warp, said layers being bonded together by from 15% to 30%, by weight of said armor plate, of thermosetting synthetic resin material.

6. A lightweight self-sustaining laminated armor plate capable of local delamination under the impact of a projectile, said armor plate having a thickness of about 1/8 to about 3/16 inch, and comprising about 12 to about 18 cross-laminated layers of closely packed continuous glass yarn warp and spaced continuous glass yarn filling fabric, the number and thickness of said glass warp yarns greatly exceeding the number and thickness of said glass filling yarns, and said glass warp yarns being freely slidable on said glass filling yarns prior to the bonding of said layers, whereby each of said layers is rendered stretchable only in a direction normal to its warp but strongly resistant to stretch in a direction parallel to its warp, said layers being bonded together by from 15% to 30%, by weight of said armor plate, of styrene and polyhydric alcohol polybasic acid ester copolymer resin.

7. An armor plate according to claim 6, wherein the weight of the warp threads per linear inch of said layers is about 20 times the weight of the filling threads.

ARTHUR ROSE.
GEORGE J. MERRITT.

REFERENCES CITED

The following references are of record in the file of this patent:

UNITED STATES PATENTS

| Number | Name | Date |
|---|---|---|
| 232,122 | Hammesfahr | Sept. 14, 1860 |
| 2,318,301 | Eger | May 4, 1943 |
| 2,331,263 | Britton | Oct. 5, 1943 |
| 2,377,846 | Dreyfus et al. | June 5, 1945 |
| 2,414,125 | Rheinfrank | Jan. 14, 1947 |
| 2,419,440 | Delmonte | Apr. 22, 1947 |
| 2,466,597 | Kropscott | Apr. 5, 1949 |

FOREIGN PATENTS

| Number | Country | Date |
|---|---|---|
| 367,658 | Great Britain | Feb. 25, 1932 |

OTHER REFERENCES

Miracles in Glass, article, Science News Letter, January 13, 1945, pages 26 and 28.

Modern Plastics, vol. 12, No. 9, May 1944, page 102, column 2, paragraphs 1 and 2.